US012535763B2

(12) United States Patent
Takano et al.

(10) Patent No.: US 12,535,763 B2
(45) Date of Patent: Jan. 27, 2026

(54) IMAGE FORMING APPARATUS THAT CONTROLS SHEET INTERVAL

(71) Applicant: CANON KABUSHIKI KAISHA, Tokyo (JP)

(72) Inventors: Hiromitsu Takano, Kanagawa (JP); Takanori Mitani, Kanagawa (JP); Satoru Nagashima, Tokyo (JP); Takeshi Shimba, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/628,530

(22) Filed: Apr. 5, 2024

(65) Prior Publication Data

US 2024/0337977 A1 Oct. 10, 2024

(30) Foreign Application Priority Data

Apr. 10, 2023 (JP) ................................. 2023-063617

(51) Int. Cl.
*G03G 15/00* (2006.01)
*G03G 15/20* (2006.01)

(52) U.S. Cl.
CPC ....... *G03G 15/657* (2013.01); *G03G 15/2039* (2013.01); *G03G 15/5029* (2013.01);
(Continued)

(58) Field of Classification Search
CPC ............. G03G 15/657; G03G 15/2039; G03G 15/5029; G03G 15/2046;
(Continued)

(56) References Cited

U.S. PATENT DOCUMENTS

2007/0175880 A1* 8/2007 Iwasaki .............. G03G 15/2039 219/216
2013/0209123 A1* 8/2013 Waida ................ G03G 15/2039 399/68
(Continued)

FOREIGN PATENT DOCUMENTS

JP H06149103 A 5/1994
JP H1074017 A 3/1998
(Continued)

*Primary Examiner* — Robert B Beatty
(74) *Attorney, Agent, or Firm* — Canon U.S.A., Inc., IP Division

(57) ABSTRACT

An image forming apparatus includes a conveyance member to convey a sheet, an image forming unit, a fixing device, a component, and a controller. The image forming unit forms a toner image on the conveyed sheet conveyed. The fixing device fixes an unfixed toner image formed on the sheet, onto the sheet. Heat of the fixing device propagates to the component. The controller controls a passing sheet interval between a plurality of sheets passing through the fixing device. The controller executes throughput control for controlling a sheet interval, which is an interval between a preceding sheet and a subsequent sheet passing through the fixing device, such that a temperature of a non-passage region through which sheets do not pass in the fixing device is suppressed to a predetermined first limit temperature or less and a temperature of the component is suppressed to a predetermined second limit temperature or less.

18 Claims, 12 Drawing Sheets

(52) U.S. Cl.
CPC .................... *B65H 2301/13* (2013.01); *G03G 2215/00413* (2013.01); *G03G 2215/00945* (2013.01); *G03G 2215/2045* (2013.01)

(58) Field of Classification Search
CPC .......... G03G 2215/00413; G03G 2215/00472; G03G 2215/0059; G03G 2215/00734; G03G 2215/00945; G03G 2215/2045
USPC ....................................... 399/45, 68, 69, 400
See application file for complete search history.

(56) References Cited

U.S. PATENT DOCUMENTS

| | | | | |
|---|---|---|---|---|
| 2013/0259507 | A1* | 10/2013 | Cao | G03G 15/2042 399/69 |
| 2013/0287422 | A1* | 10/2013 | Asaka | G03G 15/2046 399/69 |
| 2021/0405567 | A1* | 12/2021 | Takayama | G03G 15/2064 |

FOREIGN PATENT DOCUMENTS

| | | | |
|---|---|---|---|
| JP | 2013235180 | A | 11/2013 |
| JP | 2018169491 | A | 11/2018 |

* cited by examiner

IMAGE FORMING APPARATUS THAT CONTROLS SHEET INTERVAL

BACKGROUND

Field

The present disclosure relates to image forming apparatus that controls sheet interval.

Description of the Related Art

A fixing device that fixes a toner image on a sheet using an electrophotographic process fixes the toner image onto the sheet by applying heat to the sheet and the toner image. The width (length in a direction perpendicular to a sheet conveying direction) of the fixing device is designed such that a sheet of a maximum size envisioned can pass through the fixing device. Accordingly, when a sheet smaller than the maximum size passes through the fixing device, the temperature of a region (non-passage region) where the sheet does not pass in the fixing device increases. This is because heat is not taken away by the sheet in the non-passage region. If the temperature of the non-passage region becomes too high, a support member that supports a heater of the fixing device and the like will be affected by the heat. In view of this, according to Japanese Patent Laid-Open No. H06-149103, it is proposed that an excessive temperature rise in a non-passage region is suppressed by providing an interval between a plurality of sheets that are to pass through a fixing device. This is called throughput-down control. The term "throughput" refers to the number of sheets processed per unit time.

Incidentally, a sheet sensor for detecting a jam is arranged outside the fixing device in some cases. In this case, it is necessary to protect the sheet sensor from the heat emitted from the fixing device.

SUMMARY

According to an aspect of the present disclosure, an image forming apparatus includes a conveyance member configured to convey a sheet, an image forming unit configured to form a toner image on the sheet conveyed by the conveyance member, a fixing device configured to fix an unfixed toner image formed on the sheet, onto the sheet, a component to which heat of the fixing device propagates, and a controller configured to control a passing sheet interval between a plurality of sheets passing through the fixing device, wherein the controller is configured to execute throughput control for controlling a sheet interval, which is an interval between a preceding sheet and a subsequent sheet passing through the fixing device, such that a temperature of a non-passage region through which sheets do not pass in the fixing device is suppressed to a predetermined first limit temperature or less and a temperature of the component is suppressed to a predetermined second limit temperature or less.

Further features of the present disclosure will become apparent from the following description of exemplary embodiments (with reference to the attached drawings).

DESCRIPTION OF THE EMBODIMENTS

Figure 1:
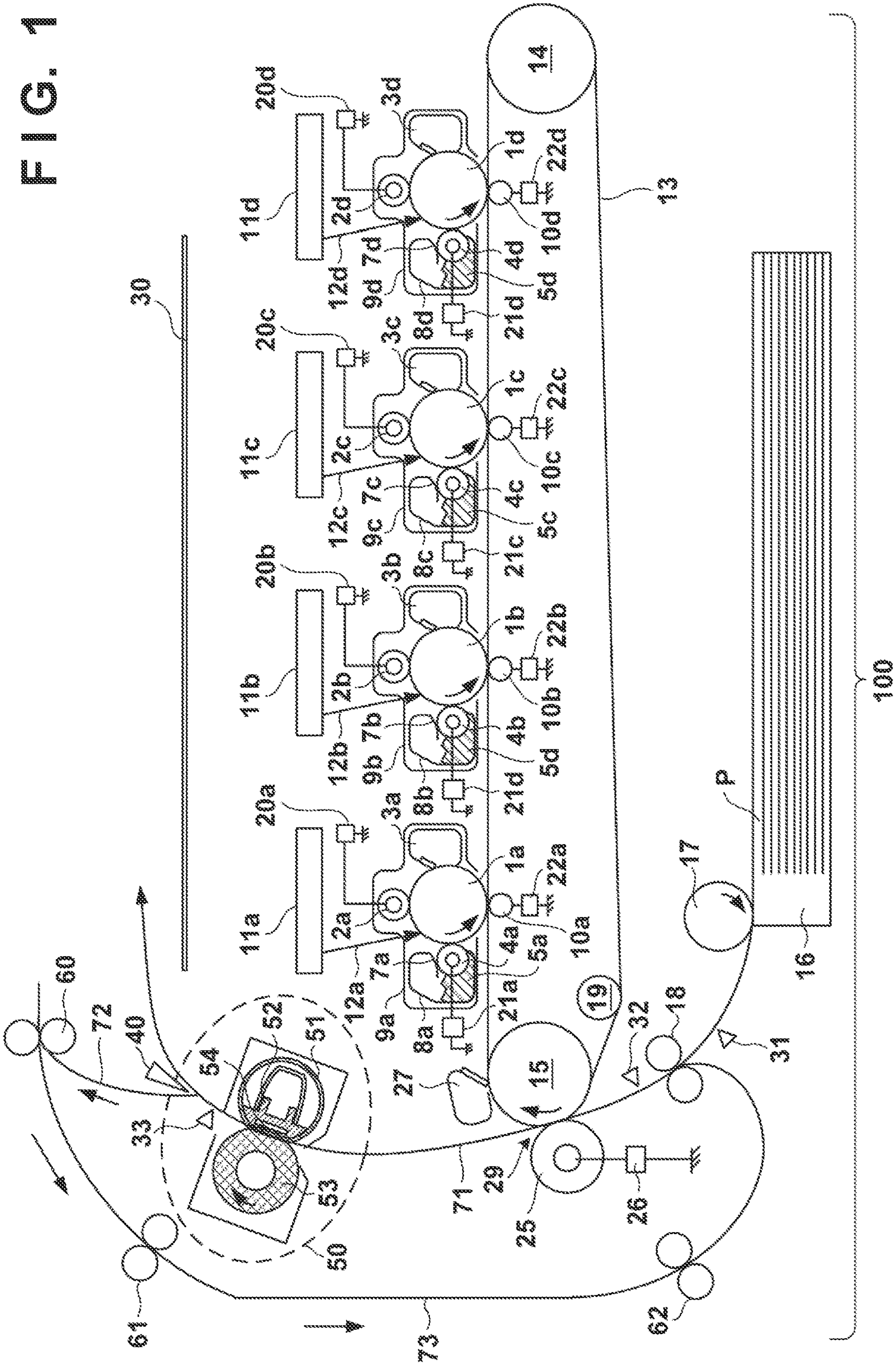
FIG. 1 is a diagram illustrating an image forming apparatus.

Hereinafter, embodiments will be described in detail with reference to the attached drawings. Note, the following embodiments are not intended to limit the scope of the disclosure. Multiple features are described in the embodiments, but limitation is not made that requires all such features, and multiple such features may be combined as appropriate. Furthermore, in the attached drawings, the same reference numerals are given to the same or similar configurations, and redundant description thereof is omitted.

Embodiment 1

(1) Structure of Image Forming Apparatus

FIG. 1 shows an image forming apparatus 100 that forms full-color images using four stations. A first station forms a yellow "Y" toner image. A second station forms a magenta "M" toner image. A third station forms a cyan "C" toner image. A fourth station forms a black "K" toner image. Note that a, b, c, and d, which are added to the ends of reference numerals, indicate yellow, magenta, cyan, and black, respectively. In this specification, when an item that is the same for the four colors is described, the letters a, b, c, and d are omitted from the reference numeral.

A process cartridge 9 is provided so as to be detachable from the main body of the image forming apparatus 100. The process cartridge 9 is formed by integrating a photosensitive drum 1, a charging roller 2, a cleaning unit 3, a development roller 4, a non-magnetic mono-component developer 5, a toner application blade 7, and a development unit 8.

The photosensitive drum 1 is an image carrier and is a cylindrical organic photosensitive. The photosensitive drum 1 rotates in the direction of the arrow. The photosensitive drum 1 includes, for example, a metal cylinder, a carrier generation layer, and a charge transport layer. The charging roller 2 comes into contact with the photosensitive drum 1, rotates following the photosensitive drum 1, and uniformly charges the surface of the photosensitive drum 1. A charging power source 20 applies a charging voltage to the charging roller 2. The cleaning unit 3 cleans toner remaining on the photosensitive drum 1 before the charging process.

The development unit 8 includes the development roller 4 that rotates in contact with the photosensitive drum 1, the developer 5 accommodated in a toner container, and the developer application blade 7. The developer application blade 7 regulates the thickness of the developer 5 that attaches to the surface of the development roller 4 to be uniform. A development power source 21 applies a development voltage to the development roller 4.

A light exposure device 11 irradiates the surface of the photosensitive drum 1 with a light beam 12 according to an image signal to form an electrostatic latent image. The light exposure device 11 may be a scanner unit that scans with laser light using a polygon mirror, or may be an LED array. LED is an abbreviation for light emitting diode.

A primary transfer roller 10 is arranged opposing the photosensitive drum 1 with an intermediate transfer belt 13 interposed therebetween. A primary transfer power source 22 applies a primary transfer voltage to the primary transfer roller 10. As a result, the toner image is transferred from the photosensitive drum 1 to the intermediate transfer belt 13 (primary transfer).

A full-color image is formed by each of the four stations (process cartridges 9*a* to 9*d*) transferring a toner image onto the intermediate transfer belt 13. The intermediate transfer belt 13 moves along the arrow shown in FIG. 1 and conveys the toner image to a secondary transfer portion 29. The intermediate transfer belt 13 is stretched around a secondary transfer opposing roller 15, a drive roller 14, and a tension roller 19. The drive roller 14 drives the intermediate transfer belt 13. Note that the drive roller 14, the tension roller 19, and the secondary transfer opposing roller 15 are connected to the ground potential.

A sheet cassette 16 is an accommodation compartment that accommodates a large number of sheets P. The cassette 16 is provided with a bottom plate that can be raised and lowered, and the bottom plate raises the sheets P. A feed roller 17 rotates while in contact with the topmost sheet P among the plurality of sheets P. As a result, the sheet P is delivered to a registration roller pair 18. The sheet P is conveyed along a conveyance path 71 that connects the sheet cassette 16 and a discharge tray 30. The conveyance path 71 may also be called a main path or a main route.

The registration roller pair 18 conveys the sheet P to the secondary transfer portion 29. The secondary transfer portion 29 is formed by a secondary transfer roller 25, the intermediate transfer belt 13, and the secondary transfer opposing roller 15. The secondary transfer roller 25 and the secondary transfer opposing roller 15 rotate while sandwiching the intermediate transfer belt 13. When the sheet P passes through a nip portion formed by the secondary transfer roller 25 and the intermediate transfer belt 13, the toner image is transferred from the intermediate transfer belt 13 to the sheet P (secondary transfer). A secondary transfer power source 86 applies a secondary transfer voltage to the secondary transfer roller 25. Thereafter, the sheet P is conveyed to a fixing device 50. The intermediate transfer belt 13 is cleaned by a belt cleaner 27.

The fixing device 50 applies heat and pressure to the sheet P and the toner image to fix the toner image onto the sheet P. The fixing device 50 includes a film 51, a nip forming member 52, a pressure roller 53, and a heater 54. The film 51 is a cylindrical rotating body that is in contact with the pressure roller 53 and rotates as a result of the pressure roller 53. The nip forming member 52 is provided inside the film 51. The nip forming member 52 comes into contact with the inner peripheral surface of the film 51 and presses the film 51 against the pressure roller 53. This forms a fixing nip. The heater 54 heats the film 51.

A print mode in which images are consecutively printed on a plurality of sheets P is called consecutive printing or a consecutive job. In consecutive printing, a sheet P that is printed on first is called a preceding sheet. A sheet P that is printed on after the preceding sheet is called a subsequent sheet. The distance from a trailing end of the preceding sheet to a leading end of the succeeding sheet is called a sheet interval.

The image forming apparatus 100 conveys the sheet P such that the centers of the conveyance paths 71, 72, and 73 coincide with the center of the sheet P in the width direction. Accordingly, both a relatively wide sheet P and a relatively narrow sheet P pass through the centers of the conveyance paths 71, 72, and 73. Here, the width direction is a direction perpendicular to the conveyance direction of the sheet P.

Width sensors 31 are arranged between the sheet cassette 16 and the registration roller pair 18, and detect the width of the sheet P. A sheet sensor 32 is a sheet sensor that is arranged between the registration roller pair 18 and the secondary transfer portion 29 and detects the timing at which the sheet S arrives. A sheet sensor 33 is arranged downstream of the fixing device 50 and detects passage and jamming of the sheet P. The sheet sensor 33 may also be arranged upstream of the fixing device 50.

A reversing portion includes a flapper 40, a reversing roller pair 60, and conveying roller pairs 61 and 62. The flapper 40 can change the conveyance path of the sheet P that has passed through the fixing device 50. In this example, the flapper 40 can guide the sheet P from the conveyance path 71 to the conveyance path 72. The sheet P guided to the conveyance path 72 is delivered to the reversing roller pair 60.

The reversing roller pair 60 pulls the sheet P into the reversing portion by rotating normally. The reversing roller pair 60 feeds the sheet P into the conveyance path 73 by rotating in reverse. The rotation direction of the conveying roller pair 61 may also be configured to be linked with the flapper 40. When the flapper 40 is in a state of guiding the sheet P to the conveyance path 72, the reversing roller pair 60 rotates normally. When the flapper 40 is in a state of guiding the sheet P to the discharge tray 30, the reversing roller pair 60 rotates in reverse.

The timing at which the rotation direction of the reversing roller pair 60 is switched is determined based on the timing at which the sheet sensor 33 detects the trailing end of the sheet P. For example, when a predetermined amount of time has elapsed from the timing when the trailing end of the sheet P was detected by the sheet sensor 33, the rotation direction of the reversing roller pair 60 is switched. As a result, the sheet P is sent from the conveyance path 72 to the conveyance path 73.

Figure 2:
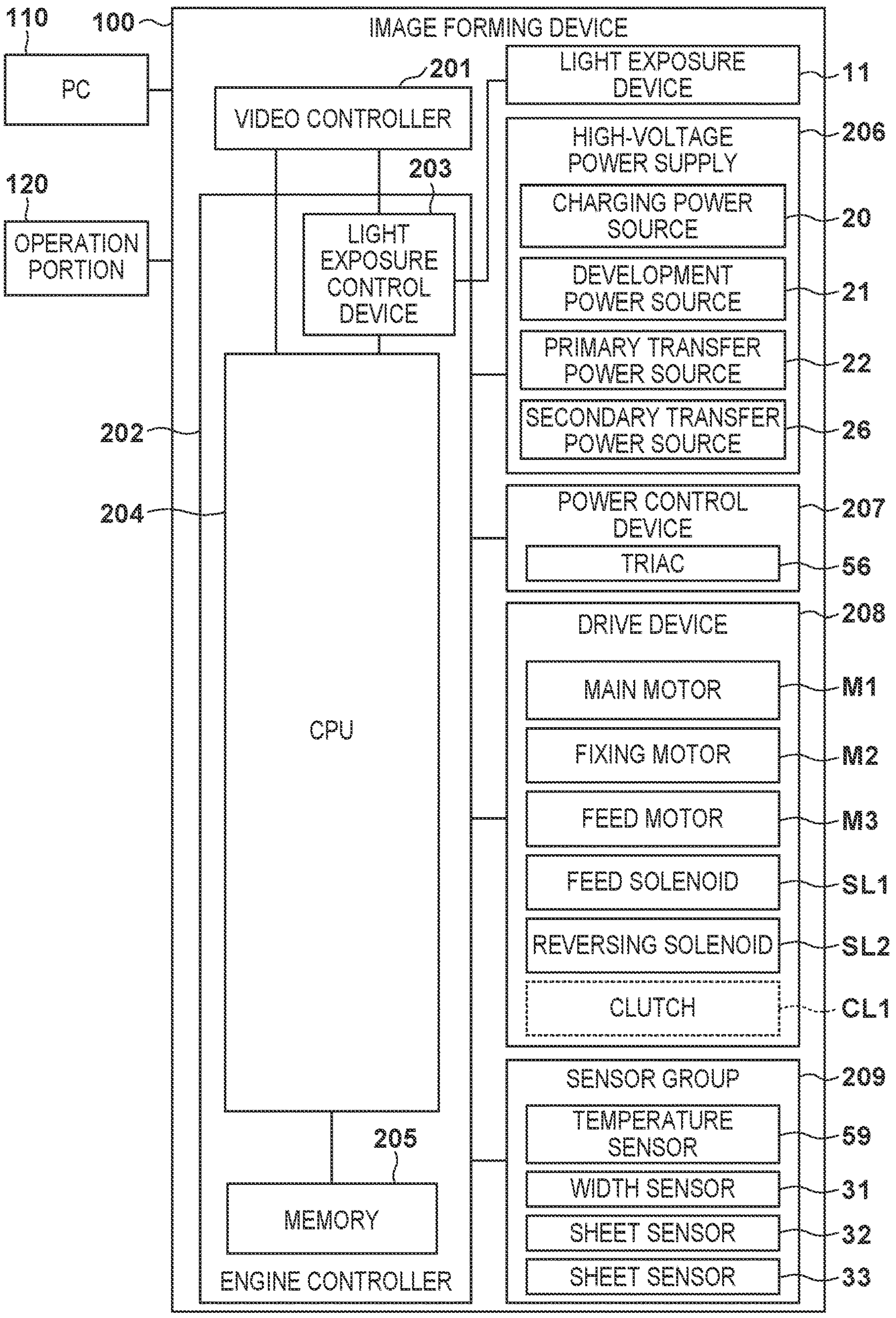
FIG. 2 is a block diagram illustrating a controller.

The conveying roller pairs 61 and 62 convey the sheet P along the conveyance path 73 to the upstream side of the conveyance path 71. The conveying roller pairs 61 and 62 rotate and stop according to a clutch CL1 (FIG. 2). The conveyance path 73 joins the conveyance path 71 on an upstream side relative to the registration roller pair 18. As a result, the sheet P having a first surface on which an image has been formed is fed to the secondary transfer portion 29 again, and an image is formed on a second surface.

(2) Controller

FIG. 2 is a block diagram illustrating a controller of the image forming apparatus 100. A PC 110, which is a host computer, outputs a print command to a video controller 201 inside the image forming apparatus 100, and transfers image data of a print image to the video controller 201. The print command may include information regarding the width, which is the length of the sheet P to be printed on in a direction perpendicular to the conveying direction. Note that specification of the width of the sheet P may also be input by a user through an operation unit 120 provided in the image forming apparatus 100. The operation unit 120 may include a display device (e.g., a liquid crystal display) and an input device (a touch sensing panel).

The video controller 201 converts image data input from the PC 110 into light exposure data, and transfers the light exposure data to a light exposure control device 203 in the engine controller 202. The light exposure control device 203 is controlled by the CPU 204, controls the turning on and off of the exposure data, and controls the exposure device 11. The CPU 204 controls the image forming apparatus 100 according to a control program stored in the memory 205. Upon receiving the print command, the CPU 204 starts an image forming sequence.

The engine controller 202 includes the CPU 204, the memory 205, and the like. The memory 205 is a storage device including a random access memory (RAM), a read-only memory (ROM), a solid state drive (SSD), a hard disk drive (HDD), and the like.

The high-voltage power source 206 includes the above-mentioned charging power source 20, development power source 21, primary transfer power source 22, and secondary transfer power source 26. Also, the power control device 207 includes a bidirectional thyristor (hereinafter referred to as a TRIAC) 56. The TRIAC 56 is a switch element that allows or stops the flow of an alternating current supplied from a commercial AC power source or the like through the heater 54.

The drive device 208 includes a main motor M1, a fixing motor M2, a feed motor M3, a feed solenoid SL1, a reversing solenoid SL2, and the clutch CL1. The main motor M1 drives the photosensitive drum 1, the intermediate transfer belt 13, the registration roller pair 18, and the like. The fixing motor M2 drives the pressure roller 53. The feed motor M3 drives the feed roller 17. The feed solenoid SL1 brings the feed roller 17 into contact with the sheet P or separates the feed roller 17 from the sheet P. The reversing solenoid SL2 switches the flapper 40. The clutch CL1 turns on and off transmission of a driving force from the main motor M1 to the conveyance roller pairs 61 and 62. The clutch CL1 is optional.

A sensor group 209 includes a temperature sensor 59, the width sensors 31, and the sheet sensors 32 and 33. The temperature sensor 59 detects the temperature of the fixing device 50. The detection results of the sensor group 209 are transmitted to the CPU 204. The CPU 204 acquires the detection results from the sensor group 209 provided in the image forming apparatus 100 and controls the light exposure device 11, the high-voltage power source 206, the power control device 207, and the drive device 208. As a result, the CPU 204 controls the formation of the electrostatic latent image, the development of the electrostatic latent image, the transfer of the toner image, the fixing of the toner image onto the sheet P, and the like.

(3) Details of Fixing Device

Figure 3:
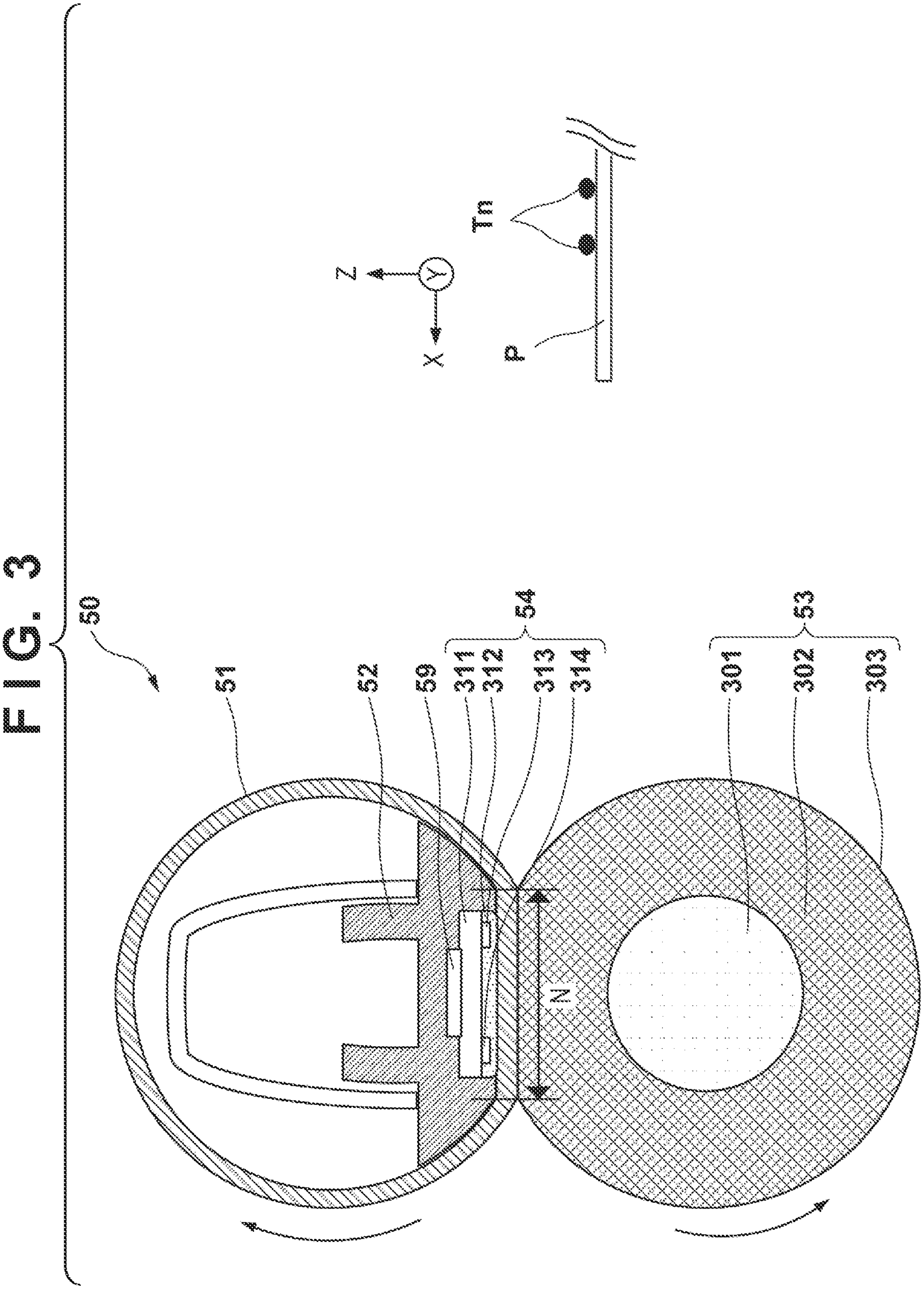
FIG. 3 is a diagram illustrating a fixing device.

FIG. 3 shows a cross-sectional view of the fixing device 50. Hereinafter, the lengthwise direction is a direction parallel to the rotation shaft (axis) 301 of the pressure roller 53, which is substantially orthogonal to the conveyance direction of the sheet P. The length of the sheet P and the length of the heating element in the direction (lengthwise direction) substantially orthogonal to the conveyance direction are called widths. As shown in FIG. 3, the direction parallel to the conveyance direction of the sheet P is defined as the X direction. The direction orthogonal to the X direction is defined as the Z direction. The direction opposing the X direction and the Z direction is defined as the Y direction. Thus, the rotation shaft 301 of the pressure roller 53 is parallel to the Y direction.

As shown in FIG. 3, the sheet P carrying the unfixed toner image Tn is conveyed in the X direction and enters a fixing nip N. The fixing nip N is formed by the pressure roller 53 and the film 51 coming into contact with each other. Both ends of the rotation shaft 301 of the pressure roller 53 are rotatably held, and are driven to rotate by the fixing motor M2. An elastic layer 302 and a release layer 303 are formed on the rotation shaft 301 (which may also be called a core metal). The elastic layer 302 serves to form the fixing nip N. The release layer 303 facilitates separation of the sheet P from the pressure roller 53.

The heater 54 of the film 51 is held by the nip forming member 52 and is in contact with the inner peripheral surface of the film 51. The heater 54 includes a substrate 311, heating elements 313 and 314, and a protective glass layer 312.

As the base layer of the film 51, for example, polyimide is used. An elastic layer made of silicone rubber is formed on the base layer. A release layer made of perfluoroalkoxy-alkane (PFA) is formed on the elastic layer. Grease is applied between the nip forming member 52 and the film 51. Similarly, grease is applied between the heater 54 and the film 51. This reduces frictional forces.

The nip forming member 52 guides the film 51 from inside and forms the fixing nip N with the pressure roller 53 via the film 51. The nip forming member 52 is a member having rigidity, heat resistance, and heat insulation properties, and is made of, for example, a liquid crystal polymer. A cylindrical film 51 is fitted onto the nip forming member 52.

Figure 4A:
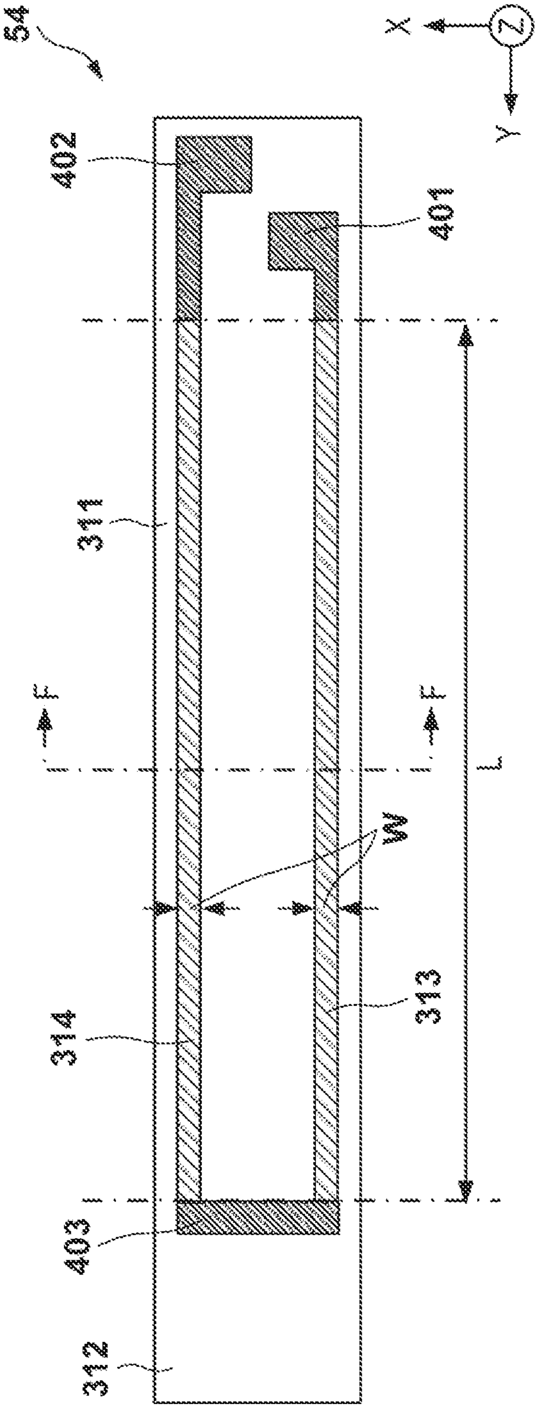
FIGS. 4A and 4B are diagrams illustrating a heater.
Figure 4B:
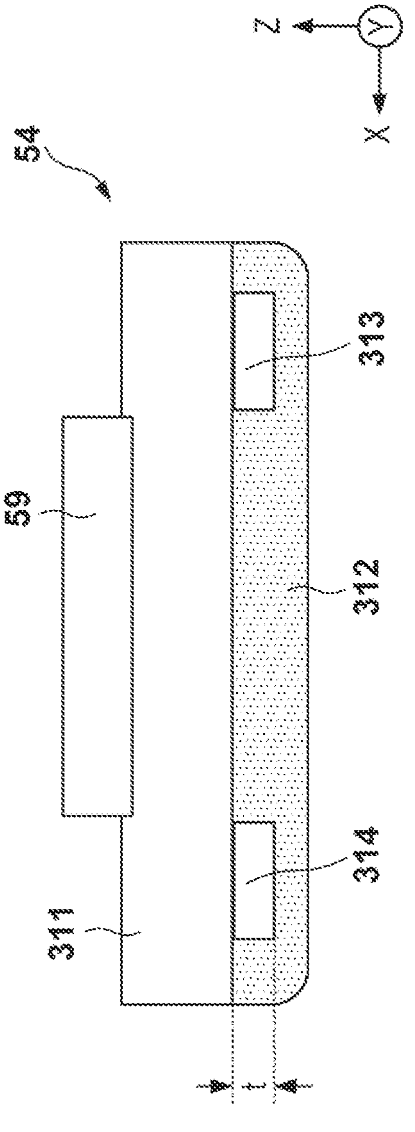

FIG. 4A is a plan view of the heater 54. FIG. 4B is a cross-sectional view of the heater 54 along a cutting line F-F. The cutting line F-F corresponds to the center line of the heating elements 313 and 314 in the lengthwise direction. The cutting line F-F also coincides with the center line in the lengthwise direction of the sheet P conveyed through the fixing device 50. The cutting line F-F may also be called a reference line.

The heater 54 includes a substrate 311, the heating elements 313 and 314, contacts 401 and 402, a conductive path 403, and a protective glass layer 312. The substrate 311 is, for example, a ceramic substrate made of ceramic alumina ($Al_2O_3$). Aluminum nitride (AlN), zirconia ($ZrO_2$), silicon carbide (SiC), or the like may be used instead of alumina ($Al_2O_3$). As the substrate 311, a metal having excellent strength may also be used. Stainless steel (SUS) may be used as such a metal substrate. If the substrate 311 is conductive, an insulating layer is further provided. On the substrate 311, heating elements 314 and 313, contacts 401 and 402, and a conductive path 403 are formed. A protective glass layer 312 is formed on the heating elements 314 and 313. The protective glass layer 312 ensures insulation between the heating elements 314 and 313 and the film 51.

The length of the heating element 313 in the Y direction (hereinafter also referred to as size) is equal to the length of the heating element 314 in the Y direction. This length is defined as L. The thickness t (dimension in the z direction) of the heating elements 313 and 314 is, for example, 10 μm. The width W (dimension in the x direction) of the heating elements 313 and 314 is, for example, 0.7 mm. The length L of the heating elements 313 and 314 is, for example, 222 mm. The heating elements 314 and 313 correspond to the width of an A4 (210-mm) sheet P. The electrical resistance value of the heating elements 314 and 313 is, for example, 20Ω.

The contact 401 is provided at one end of the heating element 314. The contact 402 is provided at one end of the heating element 313. The conductive path 403 is electrically connected to the other ends of the heating elements 314 and 313. The combined electrical resistance value of the heating elements 314 and 313 is 10Ω.

The interval between the heating elements 314 and 313 in the X direction is, for example, 2.6 mm. In Embodiment 1, the width W of the heating element 313 and the width W of the heating element 314 are both 0.7 mm, but this is merely an example. There are cases in which it is difficult to form the heating elements 313 and 314 of the same width, depending on the performance required of the fixing device 50. In this case, the width W of the heating element 313 and the width W of the heating element 314 may be different from each other according to the performance required of the fixing device 50.

The temperature sensor 59 is, for example, a thermistor. The protective glass layer 312 is provided on a first surface of the substrate 311, and the temperature sensor 59 is provided on a second surface of the substrate 311. The first surface and the second surface are opposite surfaces. The temperature sensor 59 is a sensor whose output value changes depending on the temperature of the heater 54. The temperature sensor 59 is connected to the CPU 204 and outputs the temperature of the heater 54 to the CPU 204.

(4) Sheet Size, Heating Elements, and Throughput

Figure 5:
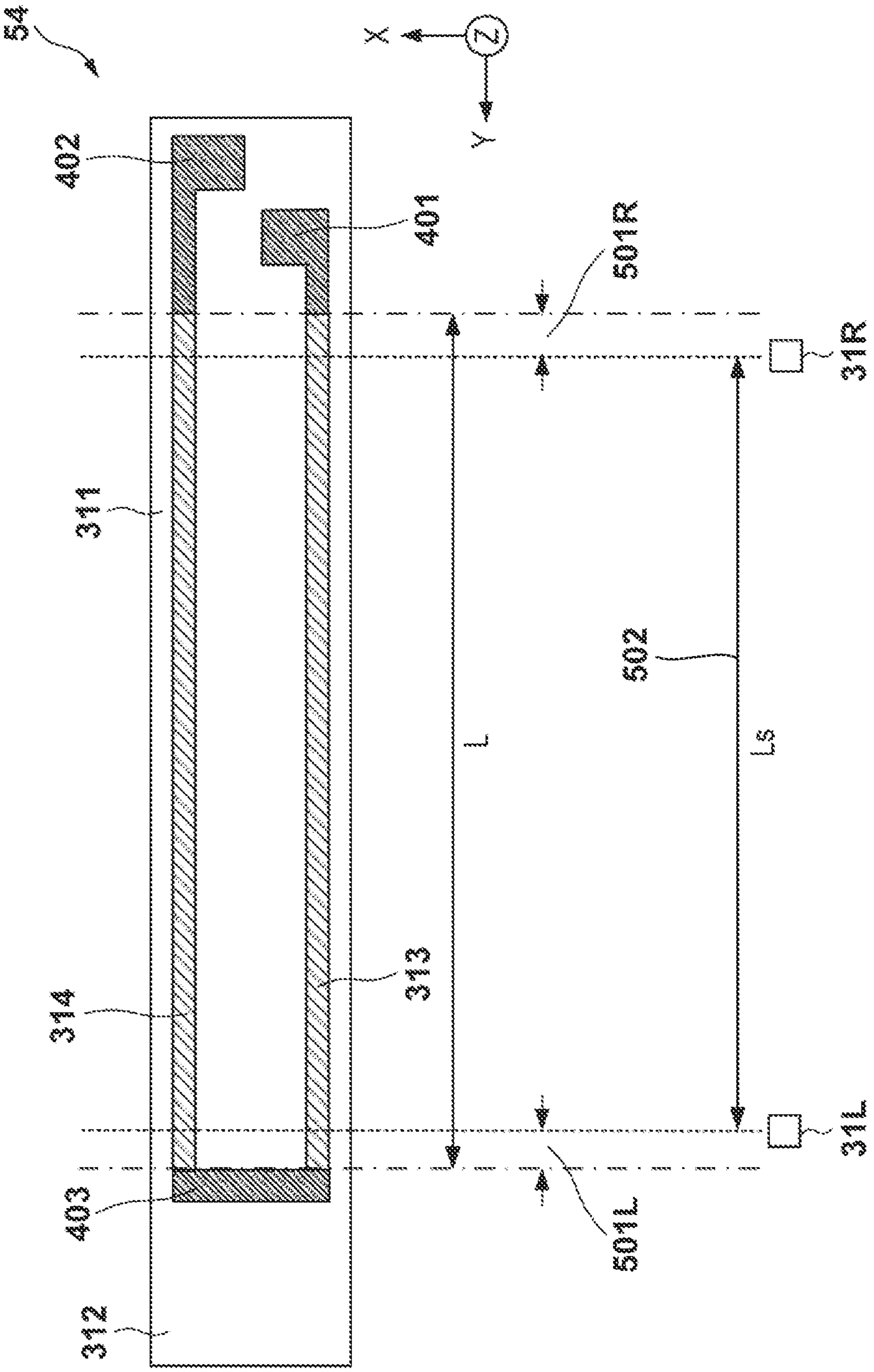
FIG. 5 is a diagram illustrating the heater, width sensors, and a sheet passage region.

FIG. 5 is a diagram illustrating the relationship between the size of sheet P and throughput. According to FIG. 5, the position of the heater 54 and the positions of the width sensors 31 in the Y direction are shown schematically. The width sensors 31 are written as "width sensor 31L" and "width sensor 31R".

When the sheet P is conveyed through the conveyance path 71, the sheet P is conveyed such that the center of the sheet P in the width direction coincides with the center of the conveyance path 71 in the width direction. That is, the conveyance reference for the sheet P is a center reference. A distance Ls between the width sensor 31L and the width sensor 31R is, for example, 187 mm. In Embodiment 1, the width sensor 31L and the width sensor 31R are arranged so as to be bilaterally symmetric, but this is merely an example. As long as the width sensor 31L and the width sensor 31R can detect a sheet P of a predetermined size or less, the width sensor 31L and the width sensor 31R need not be arranged so as to be bilaterally symmetric.

A region 501L is a region that is present from the left ends of the heating elements 313 and 314 to the width sensor 31L in the Y direction. A region 501R is a region that is present from the right ends of the heating elements 313 and 314 to the width sensor 31R in the Y direction.

The CPU 204 controls the throughput of the image forming apparatus 100 depending on whether the ends of the sheet P on which printing is to be performed are in the regions 501L and 501R, or the region 502. The throughput is the number of sheets S that are processed (on which images are formed) per unit time. Hereinafter, the relationship between the regions 501L and 501R, the region 502, and the throughput will be described. "Full throughput", which is used in the following description, is the highest throughput that can be achieved by the image forming apparatus 100 of Embodiment 1.

(4-1) When Sheet P Passes through Region 502, Region 501L, and Region 501R

When both ends of the sheet P pass through the region 501L and the region 501R, the temperature of the non-passage region in the fixing device 50 becomes higher than the temperature of the passage region. The non-passage region refers to a region in the fixing nip N through which the sheet P does not pass (with which the sheet P does not come into contact). The passage region refers to a region in the fixing nip N through which the sheet P passes (with which the sheet P comes into contact).

When the width sensors 31L and 31R detect the sheet P, the area of the non-passage region becomes relatively small. That is, the difference between the temperature of the non-passage region and the temperature of the passage region does not become so large. Thus, even if printing is performed at full throughput, the pressure roller 53 and the film 51 will not melt. When both ends of the sheet P are included in the regions 501L and 501R, the CPU 204 sets the throughput of the image forming apparatus 100 to full throughput.

(4-2) When Sheet P Passes through Only Region 502

When the width sensors 31L and 31R cannot detect the sheet P, both ends of the sheet P pass through the region 502 and do not pass through the regions 501L and 501R. In this case, since the area of the non-passage region relatively increases, the difference between the temperature of the non-passage region and the temperature of the passage region becomes large. That is, the likelihood that the pressure roller 53 and the film 51 will melt becomes relatively high. To prevent this, the CPU 204 increases the sheet interval, whereby printing is continued while mitigating the temperature rise in the non-passage region. Accordingly, throughput is relatively reduced.

Figure 6:
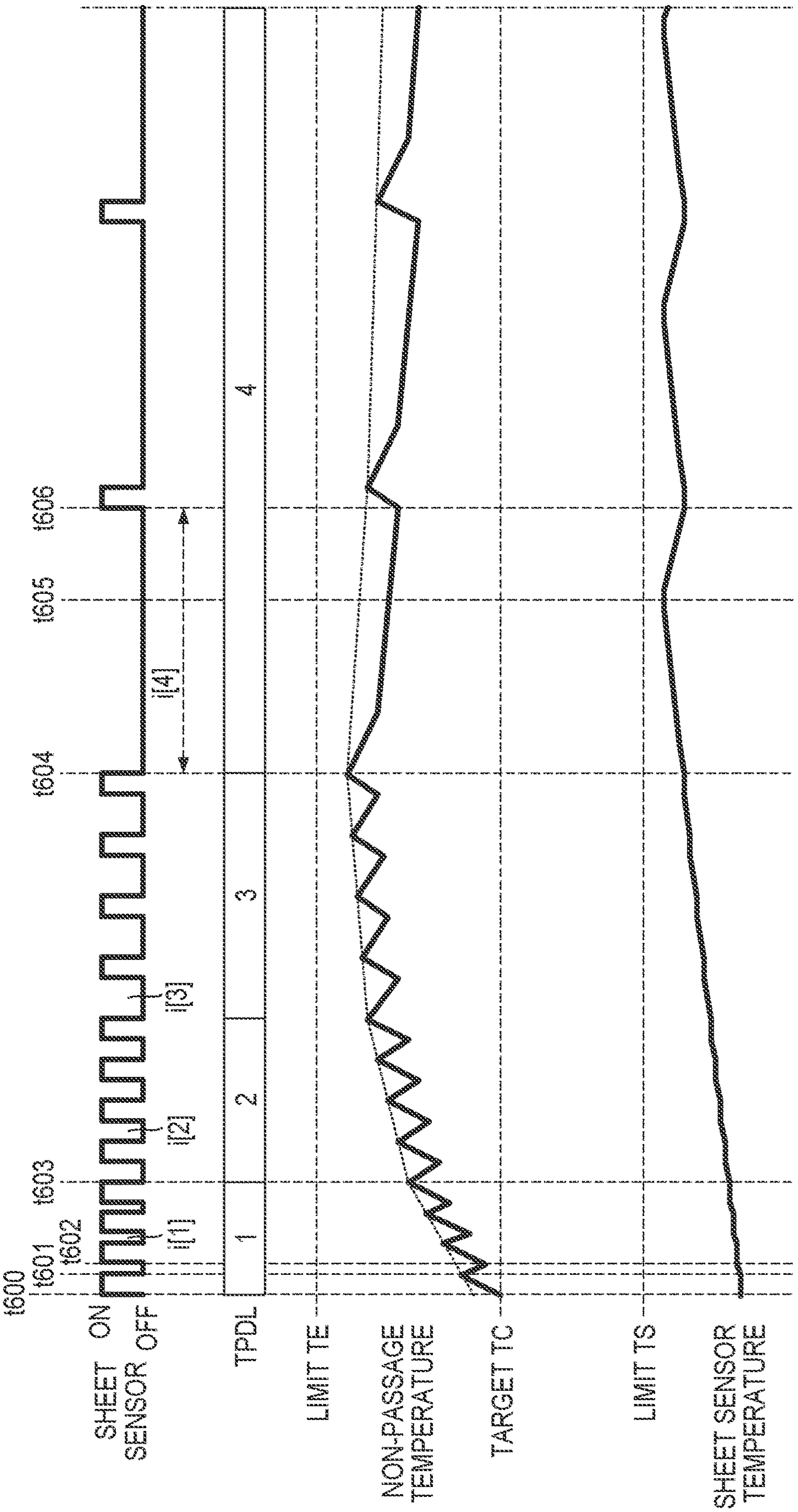
FIG. 6 is a diagram illustrating throughput control.

(5) Method for Controlling Sheet Interval (5-1) Case of Increasing Sheet Interval in Stepwise Manner FIG. 6 shows the sheet interval i when printing is executed consecutively on a plurality of sheets P of a predetermined size or less. In FIG. 6, the sheet sensor is the sheet sensor 33 arranged downstream of the fixing device 50. TPDL is an abbreviation for throughput-down level. In this case, the TPDL is a natural number from 1 to 4, for example. The sheet interval i and the TPDL are associated with each other on a one-to-one basis. Thus, the sheet interval i corresponding to the TPDL is expressed as i[TPDL]. A limit TE is a limit value of the non-passage region temperature. A target TC is a target temperature of the temperature sensor 59. That is, the TRIAC 56 supplies power to the heater 54 such that the temperature detected by the temperature sensor 59 becomes the target TC. A limit TS is a limit value of the temperature of the sheet sensor 33.

A sheet P whose two ends pass through the region 502 is printed on in some cases. In this case, the CPU 204 increases the sheet interval i in a stepwise manner such that the temperature of the fixing nip N does not exceed the limit TE and the temperature of the sheet sensor 33 does not exceed the limit TS.

Time t600: Before the sheet P reaches the fixing nip N, the temperature of the temperature sensor 59 reaches the target TC. The fixing device 50 executes fixing processing on the sheet P at the target TC. The sheet sensor 33 detects the leading end of the sheet P that has passed through the fixing device 50, and turns on. On refers to a state in which the sheet sensor 33 is detecting the sheet P (the sheet P is passing through). Off refers to a state in which the sheet sensor 33 is not detecting the sheet P (the sheet P is not passing through).

At this time, the sheet P passes through the center portion of the fixing device 50 in the lengthwise direction. The CPU 204 controls the TRIAC 56 such that the temperature of the temperature sensor 59 converges to the target TC. On the other hand, the sheet P does not pass through the ends of the fixing device 50 in the lengthwise direction. Heat is not taken from this non-passage region by the sheet P. For this reason, the temperature of the non-passage region gradually increases.

Time t601 to t602: When the trailing end of the sheet P passes the sheet sensor 33, the fixing processing is no longer needed. For this reason, the amount of heat required to maintain the target TC decreases, and the temperature of the non-passage region also decreases.

Time t602 to t603: A job in which images are consecutively formed on a plurality of sheets P is called a consecutive job. During this consecutive job, the fixing processing for the sheets P is executed consecutively. For this reason, the temperature of the non-passage region gradually increases. The temperature of the fixing device 50 approaches the limit TE that is thought to shorten the lifespan of the fixing device 50.

In view of this, the CPU 204 performs throughput-down control. Throughput-down control is performed based on the TPDL. The CPU 204 increases the TPDL according to the number of sheets P that are to consecutively pass through the fixing device 50. Also, the CPU 204 increases the sheet interval i[TPDL] in a stepwise manner according to the increase in the TPDL. If the sheet interval i[TPDL] is suddenly increased, the user experience will deteriorate. In view of this, multiple levels of the TPDL (e.g. 1 to 4) are defined, and the throughput is gradually reduced. According to FIG. 6, the TPDL increases by one step each time four sheets P are consecutively printed on.

Time t603 to t604: As printing continues, the temperature of the sheet sensor 33 also gradually increases. This is because the heat radiated from the fixing device 50 is transmitted (propagates) to the sheet sensor 33. Eventually, the temperature of the sheet sensor 33 approaches the limit TS that may shorten the lifespan of the sheet sensor 33. However, when a sheet interval larger than the predetermined sheet interval is ensured, the amount of heat of the fixing device 50 decreases, and the temperature of the sheet sensor 33 also gradually decreases. When the TPDL reaches a predetermined level or higher, the sheet interval i may also be determined by taking into consideration both the temperature of the sheet sensor 33 and the TPDL.

Time t604: According to FIG. 6, when the TPDL reaches 4, the temperature of the sheet sensor 33 becomes more severe than the temperature of the non-passage region. In view of this, the maximum sheet interval i[4] is ensured such that a temperature rise in the sheet sensor 33 is suppressed. The first sheet interval i[4] is the time from time 604 to time t606.

Time t605 to t606: As shown in FIG. 6, the temperature of the sheet sensor 33 increases until partway through the first sheet interval i[4]. At the timing when the amount of heat of the fixing device 50 decreases, the temperature of the sheet sensor 33 also starts to decrease.

Time 606 and onward: Thereafter, the fixing processing for subsequent sheets P is performed consecutively, but the temperature of the sheet sensor 33 does not exceed the limit TS. The sheet interval i[4] is determined based on the temperature of the sheet sensor 33. For this reason, the non-passage region temperature gradually decreases from the peak temperature.

In this way, the CPU 204 sets the sheet interval i[TPDL] by giving consideration to both the temperature of the non-passage region and the temperature of the sheet sensor 33. Each time the TPDL increases, the sheet interval i[TPDL] increases and throughput decreases. This prevents the temperature of the non-passage region and the temperature of the sheet sensor 33 from exceeding their respective limit temperatures.

(5-2) Improving Throughput

Figure 7:
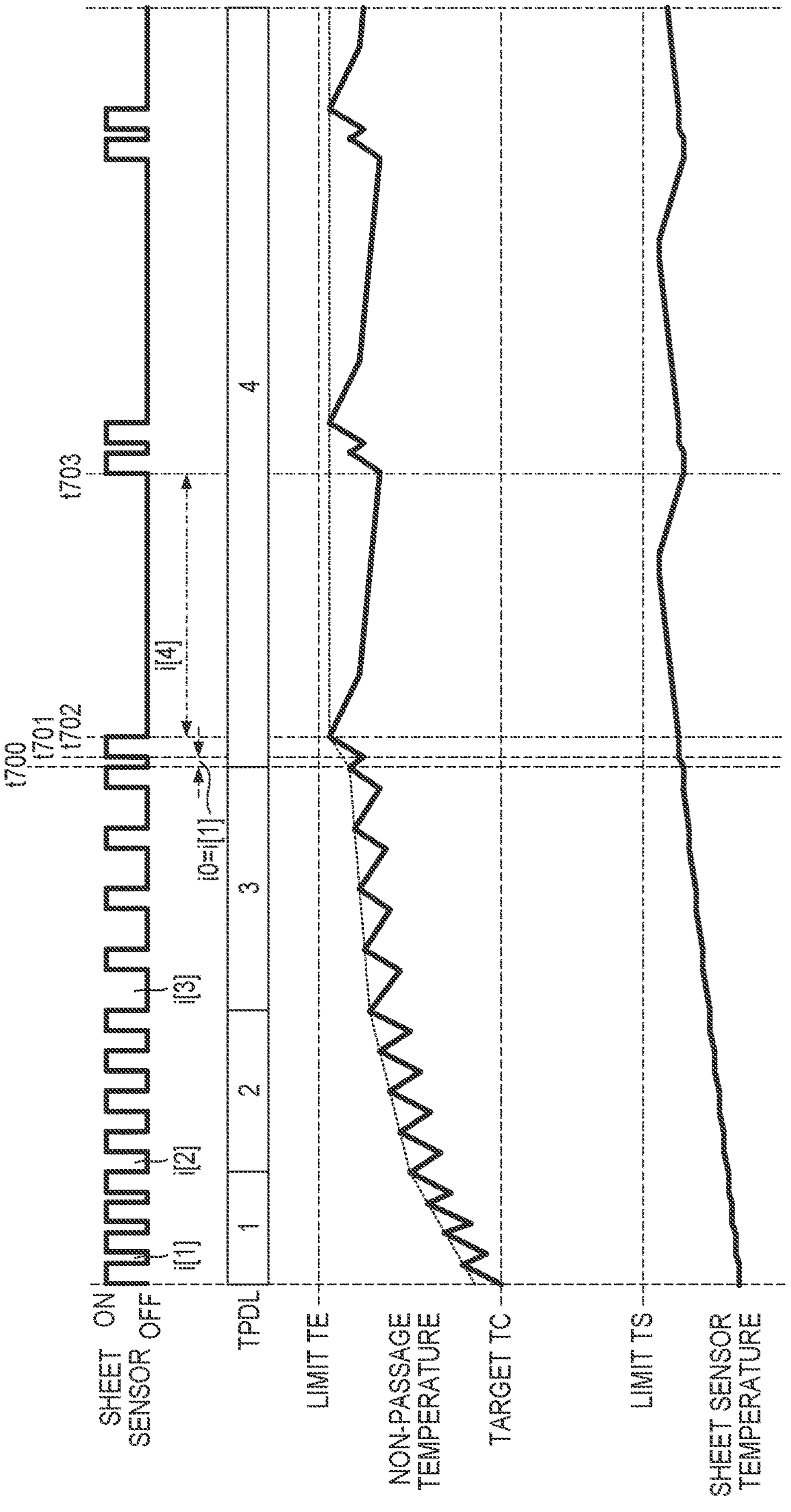
FIG. 7 is a diagram illustrating throughput control.

FIG. 7 shows an example of improving throughput. The description of FIG. 6 is used for the description of the items in FIG. 7 that are the same as those in FIG. 6. When a sheet P whose two ends pass through the region 502 is to be printed on, a sheet interval i[TPDL] corresponding to the TPDL is ensured. As a result, the temperature of the non-passing region and the temperature of the sheet sensor 33 do not exceed the limit temperature.

In FIG. 7, furthermore, when the TPDL reaches a predetermined level (e.g., TPDL=4) or higher, the sheet interval i[TPDL] corresponding to the TPDL and a predetermined sheet interval i0 are alternatingly ensured. The predetermined sheet interval i0 is, for example, the minimum sheet interval i[1] that provides the maximum throughput. As a result, neither the temperature of the non-passage region nor the temperature of the sheet sensor 33 exceed the limit temperature, and the throughput is improved.

0 to t700: In FIG. 7, the predetermined level is assumed to be 4. Accordingly, the behavior until the TPDL reaches 4 corresponds to the behavior from time t600 to t604 described with reference to FIG. 6.

Time t700 to t701: When the TPDL reaches 4, the CPU 204 sets the sheet interval i to i0 (=i[1]). The sheet interval i[1] is the minimum interval at which the sheet sensors 32 and 33 can detect the sheet P. That is, when the sheet interval i becomes shorter than i[1], the sheet sensors 32 and 33 can no longer distinguish between a preceding sheet P and a subsequent sheet P. Even if the sheet interval i is i[1], the temperature of the non-passage region decreases. However, since the sheet interval i[1] is a very short time, the amount by which the temperature of the non-passage region decreases is small.

Time t701 to t702: The CPU 204 executes the fixing processing on another sheet P in this state. The fixing processing is subsequently performed in a state where the temperature of the non-passage region has not decreased much. For this reason, the temperature of the non-passage region reaches a peak. However, the temperature of the non-passage region does not reach the limit TE.

Time t702 to t703: The CPU 204 ensures the sheet interval i[4] corresponding to the TPDL. As a result, the temperature of the non-passage region is sufficiently reduced.

On the other hand, since the minimum sheet interval i[1] is applied between times t700 and t701, the temperature of the sheet sensor 33 increases. However, since the sheet interval i[1] is a short period, the amount by which the temperature of the sheet sensor 33 increases is small. From time t702 to t703, the sheet interval i[4] is applied, whereby the temperature of the sheet sensor 33 reaches a peak, but does not reach the limit TS.

At time t703 and onward, the CPU 204 alternatingly repeats the minimum sheet interval i[1] and the sheet interval i[4]. This prevents both the temperature of the non-passage region and the temperature of the sheet sensor 33 from exceeding the limit temperature. Also, the throughput is improved in FIG. 7 compared to FIG. 6.

(6) Functions of CPU (Controller)

Figure 8:
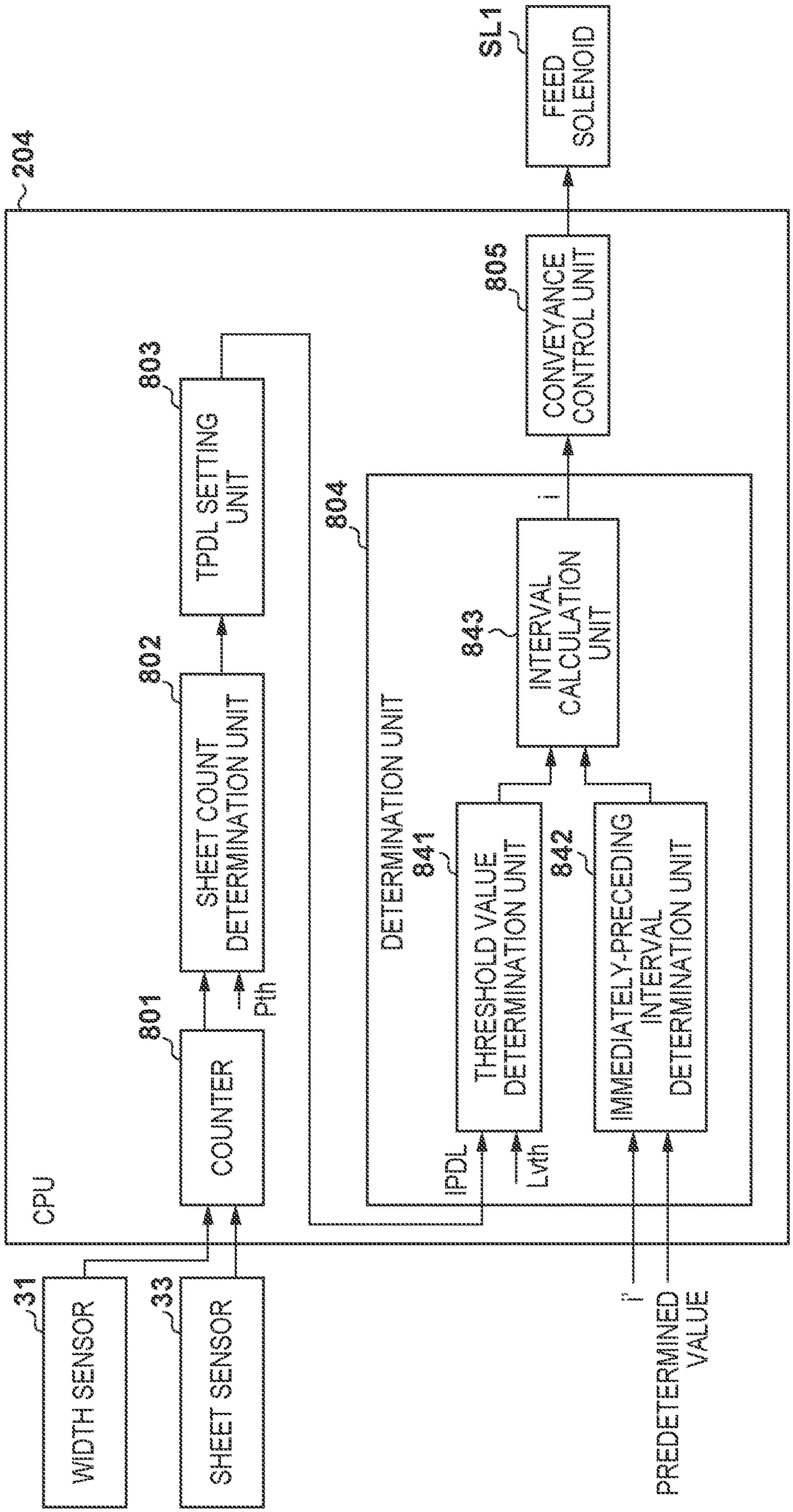
FIG. 8 is a diagram illustrating functions of a CPU.

FIG. 8 shows a plurality of functions that the CPU 204 realizes according to the control program. Some or all of these functions may also be implemented by one or more logic circuits such as application specific integrated circuits (ASICs) or field programmable gate arrays (FPGAs).

A counter 801 counts the number of sheets P that are smaller than a predetermined size and consecutively pass through the fixing device 50. For example, the counter 801 adds 1 to a count value each time the sheet sensor 33 detects the leading end of the sheet P while the width sensor 31 cannot detect both ends of the sheet P. The initial value of the count value is 0. Note that information regarding the size of the sheet P may also be input to the counter 801 from the PC 110 or the operation unit 120.

A sheet count determination unit 802 determines whether or not the count value has reached a predetermined threshold value Pth (e.g., 4). When the count value reaches the threshold value Pth, the sheet count determination unit 802 outputs an increment signal to a TPDL setting unit 803. Furthermore, when the count value reaches the threshold value Pth, the sheet count determination unit 802 initializes the count value by outputting a reset signal to the counter 801.

The TPDL setting unit 803 adds 1 to the TPDL every time an increment signal is input. The TPDL is output to a determination unit 804. The initial value of the TPDL is 1.

The determination unit 804 determines the sheet interval i based on the TPDL, a level threshold value Lvth, and the like. The determination unit 804 includes a threshold value determination unit 841, an immediately-preceding interval determination unit 842, and an interval calculation unit 843. The threshold determination unit 841 determines whether or not the TPDL is greater than or equal to the threshold value Lvth. If the TPDL is less than the threshold value Lvth, the interval calculation unit 843 refers to a table stored in the memory 205 and outputs the sheet interval i[TPDL] corresponding to the TPDL. If the TPDL is greater than or equal to the threshold value Lvth and the immediately-preceding sheet interval i' is a predetermined value (e.g., i[1]), the interval calculation unit 843 determines the sheet interval i to be i[TPDL]. If the TPDL is greater than or equal to the threshold value Lvth and the immediately-preceding sheet interval i' is not a predetermined value, the interval calculation unit 843 determines the sheet interval i to be the predetermined value. That is, when the TPDL becomes greater than or equal to the threshold value Lvth, a short interval and a long interval are alternatingly set as the sheet interval i.

The conveyance control unit 805 turns on and off the feed solenoid SL1 such that the interval from the trailing end of the preceding sheet P to the leading end of the subsequent sheet P becomes the sheet interval i. Here, it is assumed that the subsequent sheet P is fed from the sheet cassette 16. However, the subsequent sheet P may also be fed from the conveyance path 73. In this case, the conveyance control unit 805 turns on and off the clutch CL1 such that the interval from the trailing end of the preceding sheet P to the leading end of the subsequent sheet P becomes the sheet distance i. One sheet P can wait in the conveyance path 73.

(7) Flowchart

Figure 9:
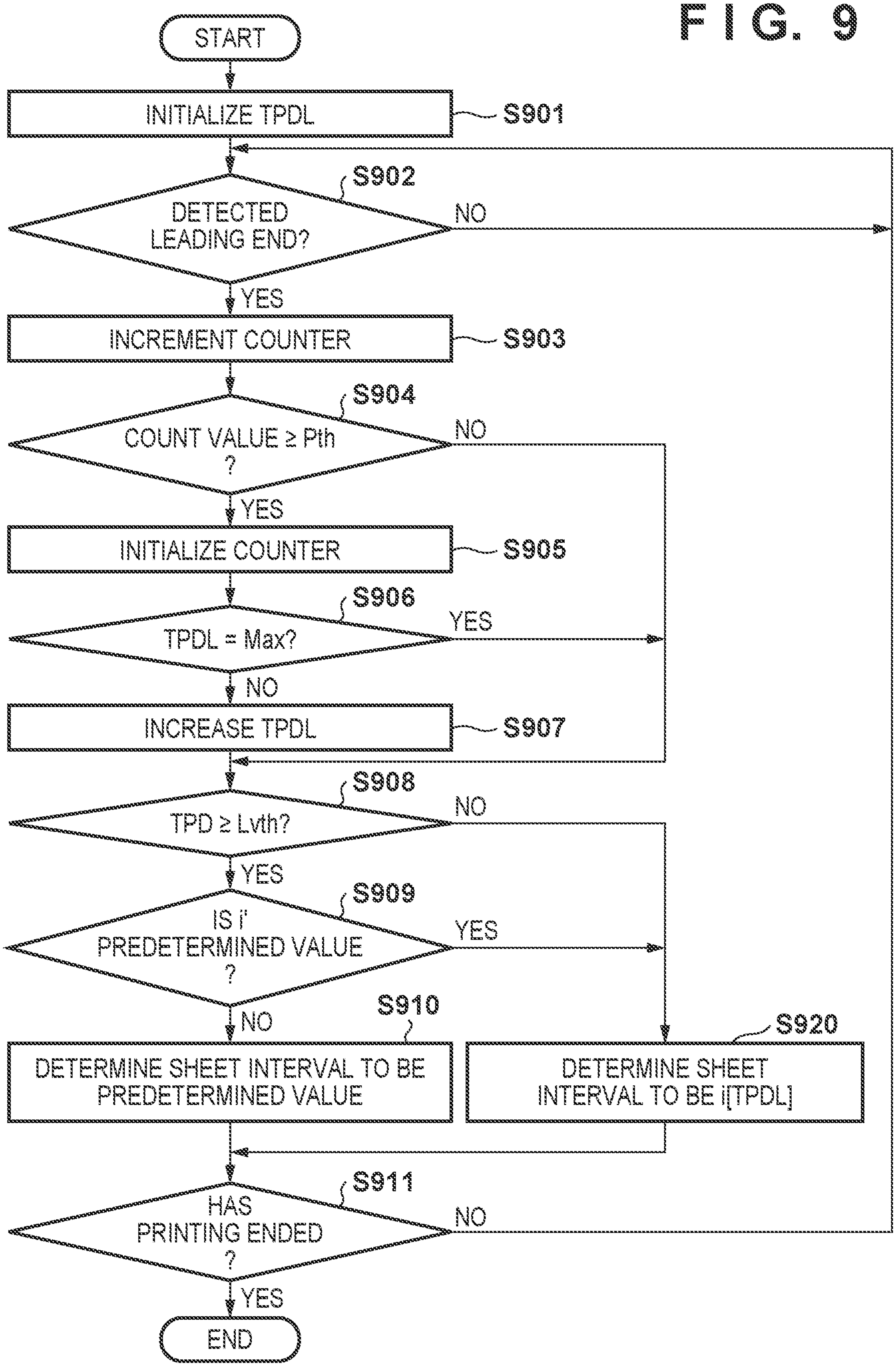
FIG. 9 is a flowchart showing a method for determining a sheet interval.

FIG. 9 shows a method for determining the sheet interval i that is executed by the CPU 204 according to a control program. Here, it is assumed that images are consecutively formed on a plurality of sheets P whose two ends cannot be detected by the width sensor 31.

In step (hereinafter referred to as S) 901, the CPU 204 initializes the TPDL. For example, "1" is assigned to the TPDL.

In S902, the CPU 204 determines whether or not the leading end of the sheet P has been detected by the sheet sensor 33. When the leading end is detected, the CPU 204 proceeds from S902 to S903.

In S903, the CPU 204 increments the counter 801. That is, 1 is added to the count value.

In S904, the CPU 204 (sheet count determination unit 802) acquires the count value from the counter 801 and determines whether or not the count value is greater than or equal to the threshold value Pth (e.g., 4). If the count value is less than the threshold value Pth, the CPU 204 advances from S904 to S908. On the other hand, if the count value is greater than or equal to the threshold value Pth, the CPU 204 advances from S904 to S905.

In S905, the CPU 204 initializes the counter 801. The initial value of the counter 801 is 0.

In S906, the CPU 204 (TPDL setting unit 803) determines whether or not the TPDL is a maximum value Max. If the TPDL is the maximum value Max, the CPU 204 advances from S906 to S908. This prevents the TPDL from increasing beyond the maximum value Max. If the TPDL is less than the maximum value Max, the CPU 204 advances from S906 to S907.

In S907, the CPU 204 (TPDL setting unit 803) increases the TPDL. For example, 1 is added to the TPDL.

In S908, the CPU 204 (threshold determination unit 841) determines whether or not the TPDL is greater than or equal to the level threshold value Lvth. The level threshold value Lvth is, for example, 4. That is, the level threshold value Lvth may also be equal to the maximum value Max. If the TPDL is not greater than or equal to the level threshold value Lvth, the CPU 204 advances from S908 to S920. In S920, the CPU 204 (interval calculation unit 843) determines the sheet interval i to be i[TPDL]. Thereafter, the CPU 204 advances from S920 to S911. If the TPDL is greater than or equal to the level threshold value Lvth, the CPU 204 advances from S908 to S909.

In S909, the CPU 204 (immediately-preceding interval determination unit 842) determines whether or not the immediately-preceding sheet interval i' is a predetermined value (e.g., i[1]). If the immediately-preceding sheet interval i' is the predetermined value, the CPU 204 advances from S909 to S920. In S920, the CPU 204 (interval calculation unit 843) determines the sheet interval i to be i[TPDL]. Thereafter, the CPU 204 advances from S920 to S911. On the other hand, if the immediately-preceding sheet interval i' is not the predetermined value, the CPU 204 advances from S909 to S910.

In S910, the CPU 204 (interval calculation unit 843) determines the sheet interval i to be a predetermined value (e.g., i[1]). Thereafter, the CPU 204 advances from S910 to S911. The CPU 204 (conveyance control unit 805) conveys the sheet P according to the determined sheet interval i.

In S911, the CPU 204 determines whether or not printing designated by the user has ended. If printing has not ended, the CPU 204 returns from S911 to S902.

In Embodiment 1, when the TPDL is 4, the sheet interval i[1] and the sheet interval i[4] are alternatingly repeated. However, this is merely an example. The ensuring of k sheet intervals i[1] and the ensuring of m sheet intervals i[4] may be repeated performed. In this way, by alternatingly repeating k short sheet intervals and m long sheet intervals, both the temperature of the non-passage region and the temperature of the sheet sensor 33 are suppressed to the limit temperature or lower. Furthermore, reduction of throughput is also suppressed.

Embodiment 2

(1) Features of Embodiment 2

Embodiment 1 proposes that when the TPDL becomes greater than or equal to the level threshold value Lvth, long sheet intervals and short sheet intervals are alternatingly repeated. As a result, it is possible to suppress a temperature rise in a component (e.g., sheet sensor 33) due to heat from the fixing device 50 while suppressing a decrease in throughput of the image forming apparatus 100.

In the image forming apparatus 100 that does not include the clutch CL1, Embodiment 2 suppresses an excessive temperature rise in the non-passage region and an excessive temperature rise in the sheet sensor 33, and suppresses a decrease in throughput as well. As a result, even in the image forming apparatus 100 that does not include the clutch CL1, conveyance defects such as paper jams are less likely to occur, and a temperature rise in the non-passage region can be suppressed. Also, since the clutch CL1 is not required, the manufacturing cost of the image forming apparatus 100 is reduced.

In the image forming apparatus 100 of Embodiment 2, the clutch CL1 shown in FIG. 2 is merely omitted. Thus, the description of Embodiment 1 is used for the description of the items in Embodiment 2 that are the same as those of Embodiment 1.

(2) Method for Controlling Sheet Interval

The image forming apparatus 100 of Embodiment 1 includes the clutch CL1. For this reason, when the clutch CL1 stops, the reversing roller pair 60 and the conveying roller pairs 61 and 62 stop. As a result, the sheet P can be kept on standby within the conveyance path 73. The image forming apparatus 100 of Embodiment 1 can perform double-sided printing. In particular, the sheet P having a first surface (front surface) on which a toner image has been formed waits in the conveyance path 73. The clutch CL1 is turned on such that the toner image on the intermediate transfer belt 13 and the sheet P conveyed from the conveyance path 73 arrive at the secondary transfer portion 29 in synchronization with each other, and conveyance of the sheet P is resumed. As a result, an image is formed on the second surface (back surface) of the sheet P. That is, since the image forming apparatus 100 of the first embodiment can keep the sheet P on standby in the conveyance path 73, the sheet interval between the sheet P (preceding sheet) having a first surface on which an image is to be formed and the sheet P (subsequent sheet) having a second surface on which an image is to be formed could be flexibly adjusted.

On the other hand, the image forming apparatus 100 of Embodiment 2 does not have the clutch CL1. For this reason, the sheet P cannot wait (stop) in the conveyance path 73. That is, the sheet interval i between the sheet P fed from the conveyance path 73 and the sheet P fed by the feed roller 17 depends on the range in which the rotation speed of the feed roller 17 can be adjusted. This range is limited by the control table (acceleration/deceleration table) applied to the feed motor M3. The sheet interval between the trailing end of the sheet P having a first surface on which an image is to be formed and the leading end of the sheet P having a second surface on which the image is to be formed is defined as ip.

In Embodiment 2 as well, when the TPDL becomes greater than or equal to the level threshold value Lvth, short sheet intervals and long sheet intervals are alternatingly repeated. However, the position where the long sheet interval can be applied is limited to the section from the trailing end of the sheet P having a second surface on which an image is to be formed to the leading end of the sheet P having a first surface on which an image is to be formed. That is, in double-sided printing, the long sheet interval is applied in the case where the sheet P fed from the conveyance path 73 is the preceding sheet. Also, the short sheet interval is applied in the case where the sheet P fed from the conveyance path 73 is a subsequent sheet. This suppresses an excessive temperature rise in the non-passage region and an excessive temperature rise in the sheet sensor 33.

Figure 10:
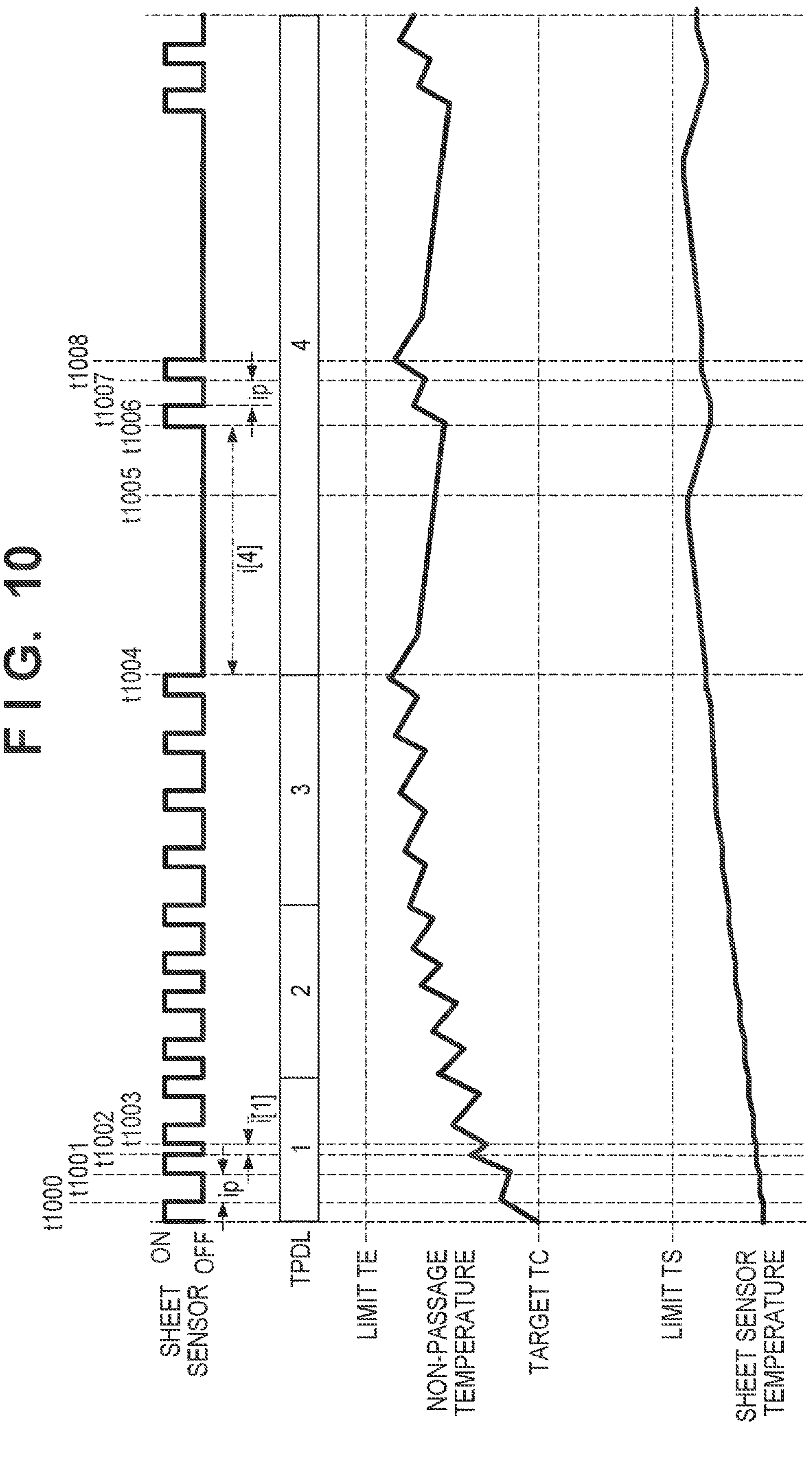
FIG. 10 is a diagram illustrating a method for increasing a sheet interval.

FIG. 10 shows the sheet interval i when printing is executed consecutively on a plurality of sheets P of a predetermined size or less.

Time t1000: The trailing end of the sheet P having a first surface on which an image has been formed passes the sheet sensor 33. As described in FIG. 1, the sheet P passes through the conveyance path 73 and is conveyed to the fixing nip N again.

Time t1001: The leading end of the sheet P having a second surface on which an image has been formed enters the sheet sensor 33. At this time, the subsequent sheet P is a sheet P having a first surface on which an image is to be formed. The sheet interval from the trailing end of the preceding sheet P having a second surface on which an image has been formed to the leading end of the subsequent sheet P is ip. At this time, the TPDL is 1, and the corresponding sheet interval is i[1]. i[1] is smaller than ip. In order to suppress an excessive temperature rise, the sheet interval when the TPDL is 1 need only be greater than or equal to the sheet interval i[1]. For this reason, the sheet interval ip is selected.

Time t1002: The trailing end of the sheet P conveyed via the conveyance path 73 passes the sheet sensor 33. The sheet interval i[1] is applied to the subsequent sheet P. That is, the leading end of the subsequent sheet P enters the sheet sensor 33 at a distance of the sheet interval i[1] from the trailing end of the preceding sheet P having a second surface on which an image has been formed. The subsequent sheet P having a first surface on which an image is to be formed is a sheet P fed from the sheet cassette 16. For this reason, the sheet interval i[1] can be applied to the subsequent sheet P.

Time t1003 to t1004: Printing continues and the TPDL increases in a stepwise manner. Until time t1004, the sheet interval i increases as described in Embodiment 1. Between times t1003 and t1004, neither the temperature of the non-passage region nor the temperature of the sheet sensor 33 exceeds the limit temperature.

Time t1004: The trailing end of the sheet P having a second surface on which an image has been formed passes the sheet sensor 33, and the TPDL increases to 4. Here as well, the sheet interval is to be alternatingly switched between i[1] and i[4]. However, first, the long sheet interval i[4] is ensured. Since the subsequent sheet P is fed from the sheet cassette 16, the long sheet interval i[4] can be ensured.

Time t1005: The temperature of the sheet sensor 33 reaches a peak while the sheet interval i[4] is ensured. However, the temperature of the sheet sensor 33 does not exceed the limit TS.

Time t1006: The leading end of the sheet P having a first surface on which an image has been formed enters the sheet sensor 33 and the long sheet interval i[4] ends. Since the sheet P having a first surface on which an image has been formed is the sheet P fed from the sheet cassette 16, the sheet interval i can be flexibly increased.

Time t1007: The trailing end of the sheet P having a first surface on which an image has been formed passes the sheet sensor 33. As a result, ensuring of the sheet interval ip from the trailing end of the sheet P having a first surface on which an image has been formed to the leading end of the subsequent sheet P fed from the conveyance path 73 is started. Since the subsequent sheet P is the sheet P fed from the conveyance path 73, the sheet interval is limited to ip.

Time t1008: The trailing end of the subsequent sheet P fed from the conveyance path 73 passes the sheet sensor 33.

Furthermore, the subsequent sheet P is a sheet P fed from the sheet cassette 16. The sheet interval i is determined to be i[4].

In Embodiment 2, when the preceding sheet P is a sheet P having a first surface on which an image is to be formed, and the subsequent sheet P is a sheet P having a second surface on which an image is to be formed, a relatively short sheet interval ip is applied. If the preceding sheet P is a sheet P having a second surface on which an image is to be formed, and the following sheet P is a sheet P having a first surface on which an image is to be formed, a relatively long sheet interval is applied. In this way, by ensuring a long sheet interval, both the temperature of the non-passage region and the temperature of the sheet sensor 33 are unlikely to exceed the limit temperature. Note that although the temperature of the non-passage region reaches a peak at time t1008, it does not exceed the limit TE.

(3) Functions of CPU

Figure 11:
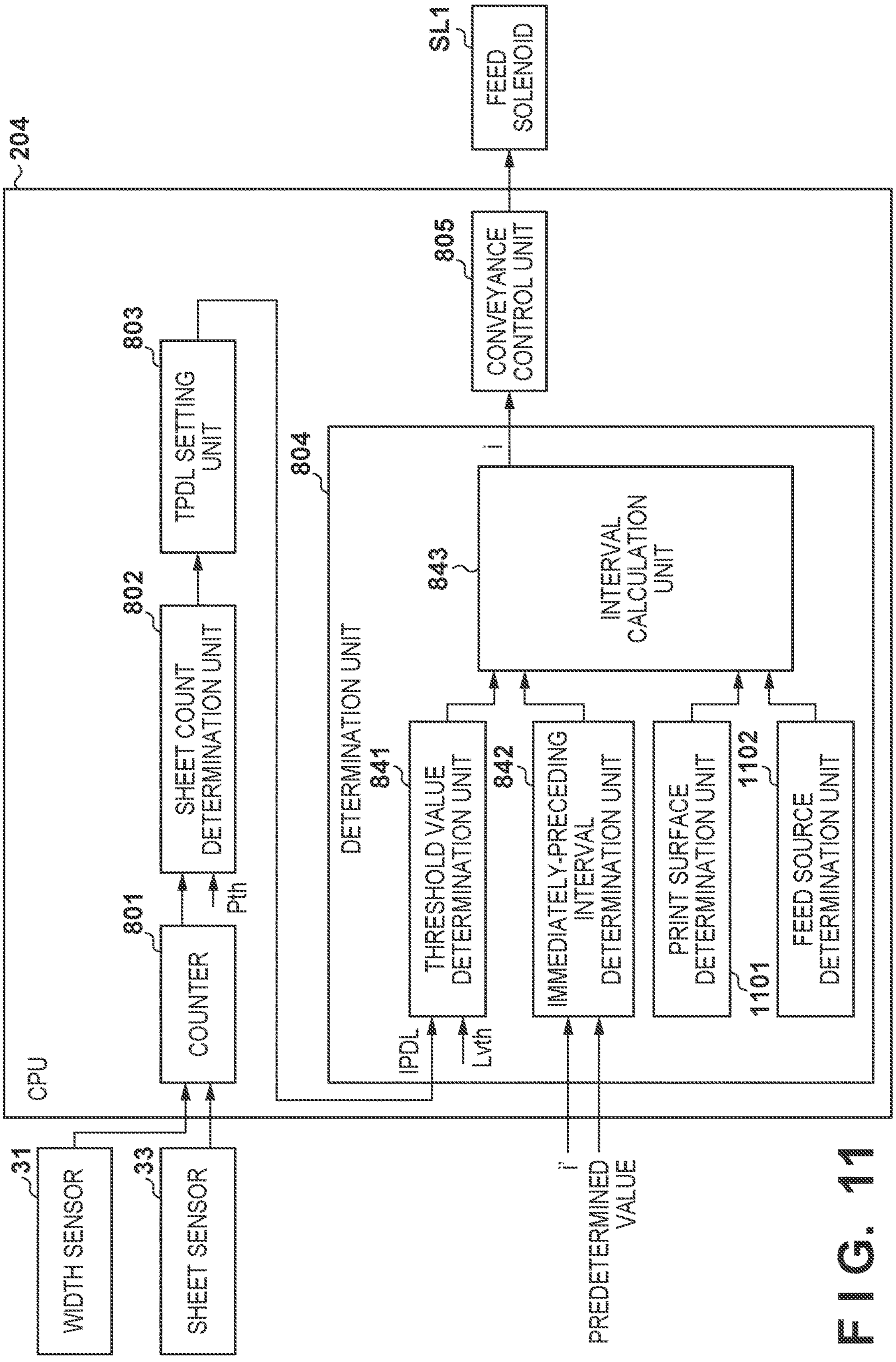
FIG. 11 is a diagram illustrating functions of the CPU.

FIG. 11 shows the functions of the CPU 204 in Embodiment 2. Among the plurality of functions shown in FIG. 11, description of the functions described in Embodiment 1 is omitted. A print surface determination unit 1101 determines whether the print surface is double-sided or single-sided by analyzing a print instruction input by the user. A feed source determination unit 1102 determines whether the feed source of a subsequent sheet P is the sheet cassette 16 or the conveyance path 73. If the printing surface is one-sided, the interval calculation unit 843 determines the sheet interval i according to Embodiment 1. If the printing surface is double-sided, the interval calculation unit 843 determines the sheet interval i according to Embodiment 2. That is, if the printing surface is double-sided, the interval calculation unit 843 determines the sheet interval i according to the feed source of the sheet P of interest. Specifically, if the feed source of the sheet P of interest is the sheet cassette 16, the sheet interval i ensured in front of the sheet P of interest is determined to be i[TPDL]. If the feed source of the sheet P of interest is the conveyance path 73, the sheet interval i ensured in front of the sheet P of interest is determined to be ip.

(4) Flowchart

Figure 12:
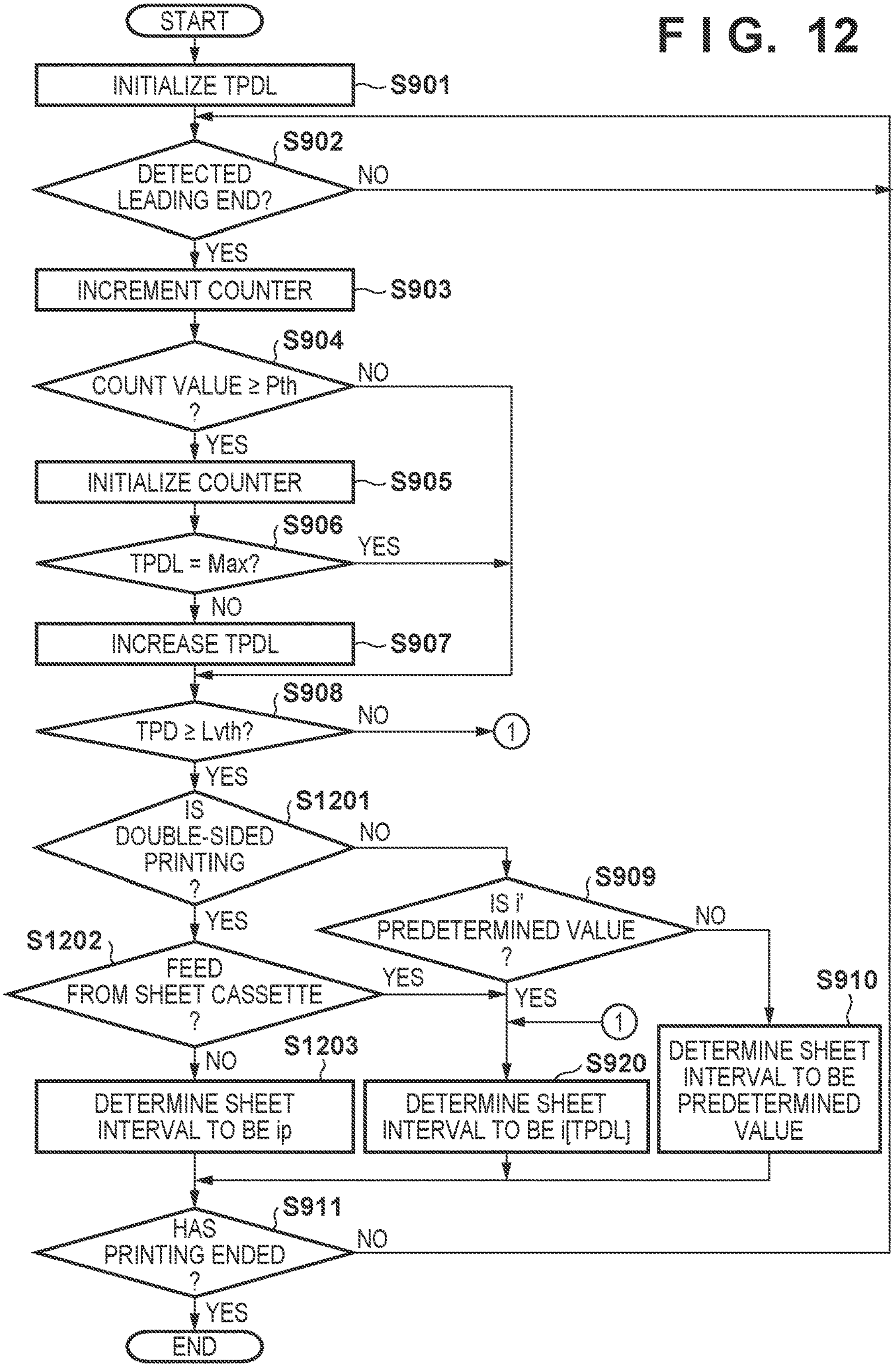
FIG. 12 is a flowchart showing a method for determining a sheet interval.

FIG. 12 shows a method for determining the sheet interval in Embodiment 2. In FIG. 12, the difference from Embodiment 1 is that S1201 to S1203 have been added.

S1201 is provided between S908 and S909. In S1201, the CPU 204 (print surface determination unit 1101) determines whether or not the print instruction input by the user is double-sided printing. If the user has instructed one-sided printing, the CPU 204 advances from S1201 to S909. S909 is as described in Embodiment 1. If the user has instructed double-sided printing, the CPU 204 advances from S1201 to S1202.

In S1202, the CPU 204 (feed source determination unit 1102) determines whether or not the feed source of the sheet P that is about to be fed to the fixing nip N is the sheet cassette 16. If the feed source of the sheet P is the sheet cassette 16, the CPU 204 advances from S1202 to S920. In S920, the CPU 204 determines the sheet interval i to be a relatively long i[TPDL]. On the other hand, if the feed source of the sheet P is not the sheet cassette 16 (that is, if the feed source is the conveyance path 73), the CPU 204 advances from S1202 to S920.

In S1203, the CPU 204 determines the sheet interval i to be ip. This is because if there is no clutch CL1, there is less freedom in determining the interval between the sheets P fed from the conveyance path 73. For this reason, the sheet interval i is determined to be ip. As a result, when the TPDL becomes greater than or equal to the level threshold value Lvth, the long sheet interval i[TPDL] is applied first, and the short sheet interval ip or i[1] is applied later.

According to Embodiment 2, even in the image forming apparatus 100 in which the sheet P cannot be kept on standby in the conveyance path 73, a decrease in throughput can be suppressed while suppressing an excessive temperature rise in the non-passage region and an excessive temperature rise in the sheet sensor 33.

Technical Ideas Derived from Embodiments

Item 1

The feed roller 17, the registration roller pair 18, and the conveying roller pairs 61 and 62 are examples of conveyance members. The photosensitive drum 1, the intermediate transfer belt 13, and the secondary transfer roller 25 are an example of an image forming unit. The sheet sensor 33 is an example of a component. The CPU 204 is an example of a controller. The CPU 204 controls the sheet interval i, which is the interval between the preceding sheet P and the subsequent sheet P passing through the fixing device 50. The sheet interval i is determined such that the temperature of the non-passage region is suppressed to a predetermined first limit temperature (e.g. TE) or less, and the temperature of the sheet sensor 33 is suppressed to a predetermined second limit temperature (e.g. SE) or less. As a result, it is possible to suppress a decrease in the throughput of the image forming apparatus 100 while suppressing a temperature rise in the component (e.g., sheet sensor 33) due to heat from the fixing device.

Item 2

The case shown in FIG. 7 is a case in which j is 12. According to FIG. 7, the sheet interval (e.g., i[1]) between the 12th sheet and the 13th sheet is smaller than the sheet interval (e.g., i[3]) between the 11th sheet and the 12th sheet. This improves throughput. Note that the value of j is determined according to parameters such as the threshold value Pth, the maximum value Max, and the level threshold value Lvth. The case shown in FIG. 7 is a case where Pth=4 and Max=Lvth=4.

Item 3

According to FIG. 7, a case is shown in which the sheet interval i is alternatingly reduced and increased. According to FIG. 10, a case is shown in which the sheet interval i is repeatedly and alternatingly increased and reduced. In this way, by alternatingly repeating a long sheet interval and a short sheet interval, a temperature rise in the component due to heat may be suppressed, and a decrease in throughput may be suppressed. Increasing the sheet interval in a stepwise manner means increasing the sheet interval every predetermined number of sheets (e.g., four sheets). Note that the predetermined number of sheets need only be one or more.

Item 4

As described above, the memory 205 stores the TPDL and the sheet interval i[TPDL] in one-to-one association with each other. As shown in FIG. 9, the CPU 204 selects one level from a plurality of levels depending on the number of sheets that are smaller than a predetermined size and consecutively pass through the fixing device 50. The CPU 204 may also read out the sheet interval corresponding to the one selected level from the memory 205. Note that the sheet interval i[TPDL] may also be calculated using a formula stored in the memory 205.

Item 5

According to the case described with respect to FIG. 9, the predetermined level is the level threshold value Lvth. When a TPDL that is greater than or equal to the level threshold value Lvth is selected, the CPU 204 may also alternatingly apply a sheet interval i[TPDL] corresponding to a predetermined level and the short sheet interval i[1].

Item 6

In FIG. 7, a case where m=1 and k=1 is illustrated. However, m may be 2 or more, and k may also be 2 or more. That is, m and k can be set as appropriate, as long as a temperature rise in the component is suppressed and a decrease in throughput is suppressed.

Item 7

In FIGS. 7 and 10, a case where k=m=1 is illustrated. m and k may be 2 or more, as long as a temperature rise in the component is suppressed and a decrease in throughput is suppressed.

Item 8

In this way, the number of consecutive short sheet intervals may be greater than the number of consecutive long sheet intervals. This may be advantageous when throughput is important. Note that the number of consecutive long sheet intervals may also be greater than the number of consecutive short sheet intervals. This may be advantageous when a temperature rise is to be suppressed.

Item 9

This is a case where the level threshold value Lvth and the maximum value Max are equal. In FIGS. 7 and 10, a case in which the level threshold value Lvth and the maximum value Max are 4 is illustrated. Note that the level threshold value Lvth and the maximum value Max may each be 5 or more. The level threshold value Lvth and the maximum value Max may each be 2 or 3.

Item 10

According to FIG. 7, a case is illustrated in which the minimum sheet interval is i[1].

Item 11

As illustrated in FIG. 10, in double-sided printing, the relatively short sheet interval may be ip. The relatively long sheet interval may be, for example, i[4].

Item 12

The minimum sheet interval is i[1]. However, as described in relation to FIG. 10, the minimum sheet interval that can be ensured for the sheets P fed from the conveyance path 73 may be ip (ip>i[1]). This is because when the sheet P cannot be kept on standby in the conveyance path 73, the minimum sheet interval is limited to ip. In this case, although the throughput decreases slightly, a temperature rise in the component can be more easily suppressed.

Item 13

According to the case shown in FIG. 10, the maximum sheet interval is i[4]

Item 14

The sheet sensor 33 is an example of a sensor. The sheet sensor 33 is an important sensor in conveyance control of the sheet P. By protecting the sheet sensor 33 from heat, conveyance control will be executed more accurately.

Item 15

The width sensor 31 is an example of a sensor. When a sheet P smaller than a predetermined size is detected, the CPU 204 may control the sheet interval i according to FIG. 9 or FIG. 12.

Item 16

The PC 110 or the operation unit 120 is an example of an input device. When a sheet P smaller than a predetermined size is specified, the CPU 204 may control the sheet interval i according to FIG. 9 or FIG. 12.

Item 17

As a result, it will be possible to suppress a decrease in the throughput of the image forming apparatus 100 while suppressing a temperature rise in a component (e.g., a frame supporting the fixing device 50, etc.) due to heat from the fixing device.

Item 18

This is illustrated in FIG. 7.

Item 19

This is illustrated in FIG. 7.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-063617, filed Apr. 10, 2023 which is hereby incorporated by reference herein in its entirety.

What is claimed is:

1. An image forming apparatus comprising:

a conveyance member configured to convey a sheet;

an image forming unit configured to form a toner image on the sheet conveyed by the conveyance member;

a fixing device configured to fix an unfixed toner image formed on the sheet, onto the sheet;

a memory configured to store a plurality of levels each indicating a degree of reducing throughput of the fixing device and a plurality of sheet intervals in one-to-one association with each other;

a component to which heat of the fixing device propagates; and a controller configured to control a passing sheet interval between a plurality of sheets passing through the fixing device, wherein the controller is configured to execute throughput control for controlling a sheet interval, which is an interval between a preceding sheet and a subsequent sheet passing through the fixing device, such that a temperature of a non-passage region through which sheets do not pass in the fixing device is suppressed to a predetermined first limit temperature or less and a temperature of the component is suppressed to a predetermined second limit temperature or less, and wherein, in selecting one level of the plurality of levels, the controller selects the one level according to a number of sheets that are smaller than a predetermined size and consecutively pass through the fixing device, reads out the sheet interval corresponding to the one selected level, and controls the conveyance member according to the read-out sheet interval.

2. The image forming apparatus according to claim 1, wherein the controller is configured to lower throughput of the fixing device by increasing the sheet interval from a first sheet to another sheet in a stepwise manner in plural sheets that are smaller than a predetermined size and consecutively pass through the fixing device, and to raise the throughput of the fixing device by reducing the sheet interval between the another sheet and a next sheet relative to the sheet interval between a prior sheet and the another sheet.

3. The image forming apparatus according to claim 1, wherein the controller is configured to lower throughput of the fixing device by increasing the sheet interval from a first sheet to another sheet in a stepwise manner in n sheets that are smaller than a predetermined size and consecutively pass through the fixing device, and wherein the sheet interval for a next sheet to a last sheet is repeatedly and alternatingly increased and reduced, or reduced and increased.

4. The image forming apparatus according to claim 1, wherein, when a predetermined level is selected out of the plurality of levels, the controller alternatingly applies the sheet interval corresponding to the predetermined level and a short sheet interval that is shorter than the sheet interval corresponding to the predetermined level.

5. The image forming apparatus according to claim 4, wherein the predetermined level is the maximum level out of the plurality of levels.

6. The image forming apparatus according to claim 4, wherein the sheet interval that is shorter than the sheet interval corresponding to the predetermined level is the minimum sheet interval out of the plurality of sheet intervals stored in the memory.

7. The image forming apparatus according to claim 1, wherein, when a predetermined level is selected out of the plurality of levels, the controller alternatingly executes (i) application of the sheet interval corresponding to the predetermined level to m sheets and (ii) application of a short sheet interval that is shorter than the sheet interval corresponding to the predetermined level to k sheets.

8. The image forming apparatus according to claim 7, wherein k and m are equal.

9. The image forming apparatus according to claim 7, wherein k is greater than m.

10. The image forming apparatus according to claim 1, wherein the conveyance member is configured to convey the sheet having a first surface on which the toner image has been formed by the fixing device to the image forming unit, and thereby cause the image forming unit to form a second toner image on a second surface of the sheet, wherein a relatively short sheet interval is applied to the sheet interval between a first sheet having a first surface on which a first sheet toner image is to be fixed and a second sheet having a second surface on which a second sheet toner image is to be fixed, where the second sheet passes through the fixing device subsequent to the first sheet, and wherein a relatively long sheet interval is applied to the sheet interval between the second sheet and a third sheet having a first surface on which a third sheet toner image is to be formed, where the third sheet passes through the fixing device subsequent to the second sheet.

11. The image forming apparatus according to claim 10, wherein the relatively short sheet interval is the minimum sheet interval out of the plurality of sheet intervals stored in the memory.

12. The image forming apparatus according to claim 10, wherein the relatively long sheet interval is the maximum sheet interval out of the plurality of sheet intervals stored in the memory.

13. The image forming apparatus according to claim 1, wherein the component includes a sensor that is provided downstream of the fixing device in a conveyance direction of the sheet and that is configured to detect jamming of the sheet.

14. The image forming apparatus according to claim 1, further comprising a sensor configured to detect a size of the sheet in an accommodation compartment in which the sheet is accommodated, or on a conveyance path on which the sheet is conveyed, wherein the controller is configured to control the sheet interval based on the size of the sheet detected by the sensor.

15. The image forming apparatus according to claim 1, further comprising an input device configured to receive input of a size of the sheet, wherein the controller is configured to control the sheet interval based on the size of the sheet input from the input device.

16. An image forming apparatus comprising:

a conveyance member configured to convey a sheet;

an image forming unit configured to form a toner image on the sheet conveyed by the conveyance member;

a fixing device configured to fix an unfixed toner image formed on the sheet, onto the sheet;

a memory configured to store a plurality of levels each indicating a degree of reducing throughput of the fixing device and a plurality of sheet intervals in one-to-one association with each other; and a controller configured to control a passing sheet interval between a plurality of sheets passing through the fixing device, wherein the controller is configured to lower throughput of the fixing device by increasing the sheet interval of a first sheet to another sheet in a stepwise manner, in plural sheets that are smaller than a predetermined size and consecutively pass through the fixing device, and to raise the throughput of the fixing device by reducing the sheet interval between the another sheet and a next sheet relative to the sheet interval between a prior sheet and the another sheet, wherein, in selecting one level of the plurality of levels, the controller selects the one level according to a number of sheets that are smaller than a predetermined size and consecutively pass through the fixing device, reads out the sheet interval corresponding to the one selected level, and controls the conveyance member according to the read-out sheet interval.

17. The image forming apparatus according to claim 16, wherein the controller is configured to lower the throughput of the fixing device by increasing the sheet interval between the next sheet and an additional sheet relative to the sheet interval between the another sheet and the next sheet.

18. The image forming apparatus according to claim 17, wherein the controller is configured to raise the throughput of the fixing device by reducing the sheet interval between the additional sheet and a further sheet relative to the sheet interval between the next sheet and the additional sheet.

* * * * *